United States Patent
Fleck et al.

(10) Patent No.: US 6,753,105 B2
(45) Date of Patent: Jun. 22, 2004

(54) FUEL CELL SYSTEM

(75) Inventors: Wolfram Fleck, Coquitlam (CA); Robert D. Merritt, Vancouver (CA); Ed Peters, Surrey (CA); Eric Pow, Vancouver (CA)

(73) Assignee: Ballard Power Systems AG, Kirchheim-Nabern (DE)

( * ) Notice: Subject to any disclaimer, the term of this patent is extended or adjusted under 35 U.S.C. 154(b) by 0 days.

(21) Appl. No.: 09/986,130

(22) Filed: Nov. 7, 2001

(65) Prior Publication Data

US 2002/0177023 A1 Nov. 28, 2002

(30) Foreign Application Priority Data

Nov. 7, 2000 (DE) .......................................... 100 55 106

(51) Int. Cl.⁷ .............................. H01M 8/00; H01M 8/12
(52) U.S. Cl. ............................................ 429/13; 429/26
(58) Field of Search ............................... 429/26, 13, 30

(56) References Cited

U.S. PATENT DOCUMENTS 5,728,483 A    3/1998 Fujitani et al. ............... 429/12

*Primary Examiner*—Patrick Ryan
*Assistant Examiner*—Thomas H. Parsons
(74) *Attorney, Agent, or Firm*—Seed IP Law Group PLLC

(57) ABSTRACT

A fuel cell system comprises a reservoir for cryogenic media and a fuel cell unit containing at least one fuel cell connected to receive fuel from the reservoir. At least a first heat exchanger is provided within a cooling circuit for the fuel cell unit, whereby heat from the first heat exchanger (3) is used, at least indirectly, to provide fuel from the reservoir. A heating circuit for the reservoir, designed to heat and/or vaporize the cryogenic medium via the first heat exchanger, is connected directly to the cooling circuit for the fuel cell unit.

8 Claims, 1 Drawing Sheet

FUEL CELL SYSTEM

BACKGROUND AND SUMMARY OF THE INVENTION

This application claims the priority of German patent document 100 55 106.8, filed Nov. 7, 2000, the disclosure of which is expressly incorporated by reference herein.

The invention relates to a fuel cell system having a reservoir for cryogenic media.

Hydrogen is used as a fuel for fuel cell systems. U.S. Pat. No. 5,728,483 discloses a stationary fuel cell system in which liquid hydrogen is stored in a tank and is vaporized to operate the fuel cell. To reduce hydrogen losses in the filling of the tank and storage of the liquid hydrogen, a hydrogen reservoir with a hydrogen absorption apparatus is provided, which absorbs hydrogen gas that leaks out of the liquid hydrogen tank. The hydrogen absorber serves as a buffer, to balance the considerable difference in demand for hydrogen between day and night operation. When necessary, the hydrogen absorber is acted upon by a heat transfer medium and is heated, creating hydrogen gas, which is then fed to the fuel cell. The heat transfer medium is also used to cool the fuel cell.

The object of the invention is to provide a fuel cell system which is especially suited for use in mobile fuel cell units.

This and other objects and advantages are achieved by the fuel cell system according to the invention, in which a heating circuit for heating and/or vaporizing the cryogenic medium (preferably liquid hydrogen) via a first heat exchanger, is coupled directly to a cooling circuit for the fuel cell unit. The heat exchanger is preferably designed to draw off the waste heat from the fuel cell system.

This arrangement has the specific advantage that the small amount of waste heat produced by a fuel cell having a low operating temperature is itself sufficient to vaporize the liquid hydrogen. In this manner, a favorable reduction in the size of the system, its weight, and the cost of the cooling device for the fuel cell system is achieved.

Other objects, advantages and novel features of the present invention will become apparent from the following detailed description of the invention when considered in conjunction with the accompanying drawings.

DETAILED DESCRIPTION OF THE DRAWINGS

Figure 1:
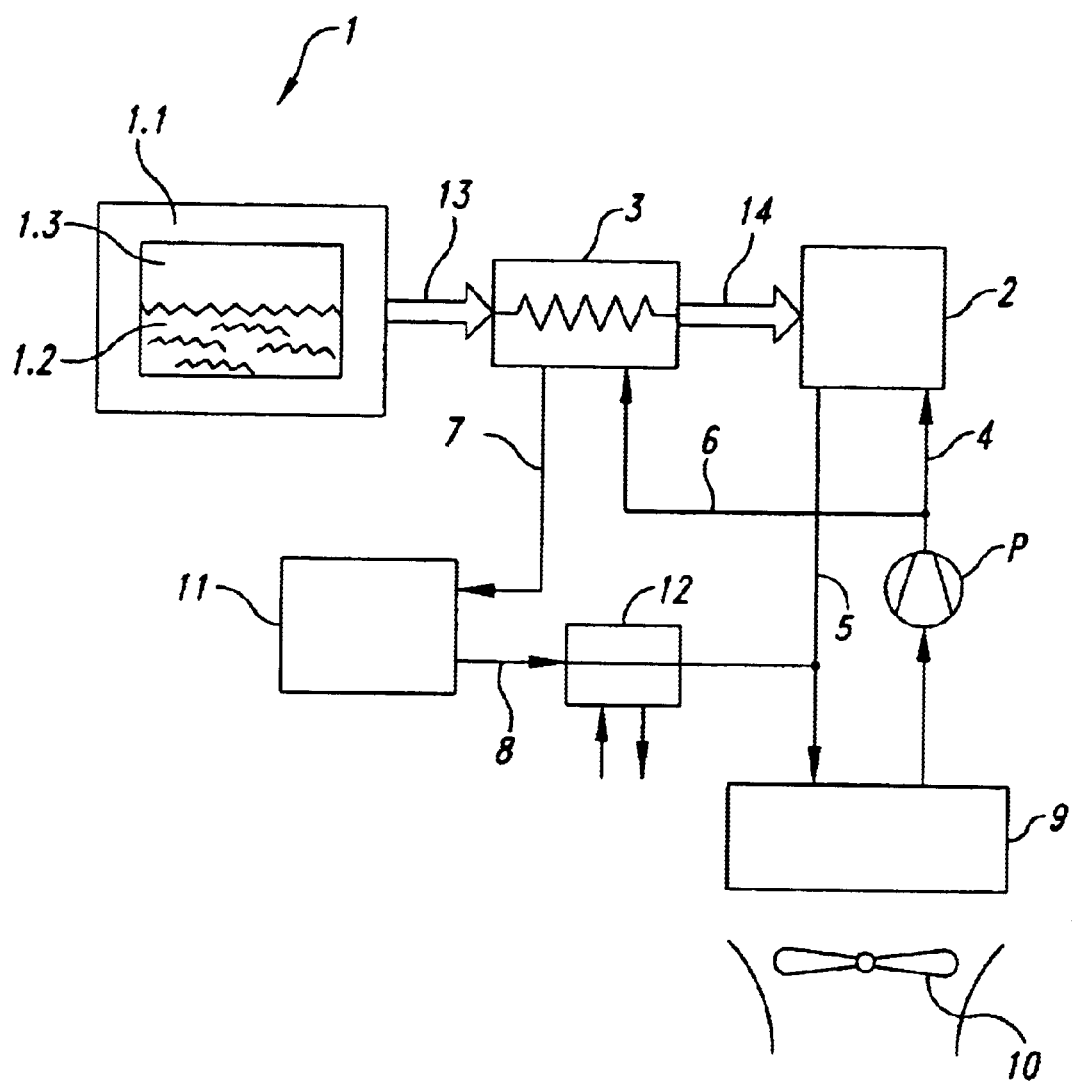
FIG. 1 is a schematic depiction of a preferred fuel cell system.

FIG. 1 shows a design for a preferred embodiment of the fuel cell system according to the invention. A reservoir 1 for a cryogenic medium holds the fuel for a fuel cell unit 2. The cryogenic medium is fed via a line 13 into a first heat exchanger 3, where it is heated and/or vaporized to provide fuel which is fed via a line 14 into the fuel cell unit 2. (Hydrogen $H_2$ is the preferred fuel, while a preferred cryogenic medium is liquid hydrogen $LH_2$ or very low-temperature hydrogen gas.)

The reservoir is preferably a superinsulated and/or vacuum insulated cryostat. An insulating shell 1.1 encases the tank containing the liquid cryogenic medium 1.2 and the gaseous insulating sheath (not shown) may be provided around the line 13 that leads from the reservoir 1 to the heat exchanger 3. In addition, a loop valve (not shown) may be provided in line 13 and/or line 14 to regulate the quantity of fuel supplied to the fuel cell unit 2.

The fuel cell unit 2 includes at least one fuel cell (not shown separately) that has an anode compartment and a cathode compartment, separated by an ion-conducting membrane (preferably, a polymer electrolytic membrane, "PEM") Preferably, multiple fuel cells are provided, which are electrically connected such that they can provide the driving energy, for example, for a vehicle.

The fuel cell unit 2 is equipped with a cooling circuit which includes a second heat exchanger 9 and lines 4, 5. The cooling medium line 5 supplies a cooling medium to the second heat exchanger 9 (preferably a convection heat exchanger), which draws waste heat off of the fuel cell unit 2, and is itself cooled, for example, via a fan 10. (The heat exchanger 9 may also be a radiant heat exchanger.)

The cooling medium is circulated via a pump P, and is fed back out of the heat exchanger 9 via the line 4 to the fuel cell unit 2. Water, or a water/glycol mixture having a sufficiently low level of electrical conductance, is used as a favorable cooling medium. (Particularly favorable for this is a cooling medium with a low freezing point, which lies well below 0° C., for example at −35° C.)

A second cooling circuit, which include lines 4, 5 and 9 is connected in parallel to the cooling circuit 4, 5, 9 of the fuel cell unit, and supplied with the same cooling medium. The cooling medium from the fuel cell unit 2, however, is now the heating medium for the heat exchanger 3, which is positioned in the flow path of the cooling medium in this heating circuit 6, 7, 8. The temperature of the cooling medium from the fuel cell unit 2 is sufficient, at least under normal operation, to heat and vaporize the liquid hydrogen.

A condenser 12 may be positioned in the flow path of the heating circuit 6, 7, 8, and used, for example, to separate water from the fuel cell waste gas. Also, a cooling device 11 is favorably included in the heating circuit 6, 7, 8, and is designed to cool the components and power electronics of the fuel cell system. The advantage is that a single circuit, consisting of the cooling circuit 4, 5, 9 and the heating circuit 6, 7, 8, and a single cooling medium, are sufficient to cool both the fuel cell unit 2 and the power electronics of the fuel cell system, and also to heat the heat exchanger 3. The cooling/heating circuit 6, 7, 8, 4, 5, 9 permits a very compact arrangement, whose heat balance of the system can be influenced very favorably. This feature is especially important in a mobile fuel cell system, where high demands are placed upon the compactness and weight of the system.

Ordinarily, PEM fuel cell systems, which operate at low temperatures of below 100° C., but must be able to tolerate high ambient temperatures of up to 40° C., require costly and heavy cooling devices must be used. Particularly in complex fuel cell systems (for example, in fuel cell vehicles), large quantities of waste heat are produced within a small space, for example from power electronics, water reuse, fuel cell cooling, cooling of the driving unit, etc., which must also be effectively drawn off. The arrangement specified in the invention permits a very advantageous combination of the requirements for drawing heat away from the fuel cell system with the requirements for heating or vaporizing a cryogenic medium. Vaporization, for example, of liquid hydrogen requires energy. Combining the process of drawing heat away from the fuel cell system and the fuel cell vehicle with the process of vaporizing the liquid hydrogen via heat simplifies the heat balance and the cooling system of the fuel cell system.

It is particularly favorable that the low temperature of the waste heat from the PEM fuel cell is sufficient to vaporize the hydrogen. With the device specified in the invention, in a fuel cell vehicle having a tank containing liquid hydrogen, a considerable share of up to 25% of the total waste heat produced can be used to vaporize liquid hydrogen.

Also favorable is that, in place of the customary large shell-and-tube vaporizer for vaporizing the cryogenic medium, compact heat exchangers are used, preferably plate-type heat exchangers.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system comprising:
   a reservoir for a cryogenic medium for providing a fuel;
   a fuel cell unit containing at least one fuel cell connected to receive the fuel from the reservoir;
   a cooling circuit for cooling the fuel cell unit; and
   a heating circuit including at least one first heat exchanger for heating the cryogenic medium provided from the reservoir to the fuel cell unit, the heating circuit being coupled directly to the cooling circuit for the fuel cell unit.

2. The fuel cell system of claim 1, wherein a cooling device is provided within the heating circuit of the reservoir, for cooling the power electronics of the fuel cell system.

3. The fuel cell system of claim 1, wherein a condenser is provided within the heating circuit of the reservoir, for condensing a medium of the fuel cell system.

4. The fuel cell system of claim 1, wherein the cooling circuit of the fuel cell unit includes a second heat exchanger, in the form of a radiant heat exchanger or a convection heat exchanger.

5. The fuel cell system of claim 1, wherein the at least one first heat exchanger includes a plate-type heat exchanger.

6. The fuel cell system of claim 1, wherein the cryogenic medium is liquid hydrogen.

7. The fuel cell system of claim 1, wherein the fuel cell unit comprises at least one PEM fuel cell.

8. A method for generating gaseous fuel from a cryogenic medium in a fuel cell system which includes a reservoir for storing the cryogenic medium, a fuel cell unit coupled to receive the gaseous fuel, and a cooling circuit for circulating a cooling medium for cooling the fuel cell unit, the method comprising:
   transferring heat from the cooling medium to the cryogenic medium by means of a heat exchanger connected between the reservoir and the fuel cell unit, by causing cooling medium from the cooling circuit to flow through the heat exchanger.

* * * * *